(12) United States Patent
Park et al.

(10) Patent No.: US 10,316,222 B2
(45) Date of Patent: Jun. 11, 2019

(54) CONDUCTIVE LAMINATE, AND TOUCH PANEL COMPRISING SAME

(71) Applicant: LG CHEM, LTD., Seoul (KR)

(72) Inventors: Min Soo Park, Daejeon (KR); Se Woo Yang, Daejeon (KR); Suk Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 873 days.

(21) Appl. No.: 14/532,686

(22) Filed: Nov. 4, 2014

(65) Prior Publication Data

US 2015/0050853 A1 Feb. 19, 2015

Related U.S. Application Data

(63) Continuation of application No. PCT/KR2013/004772, filed on May 30, 2013.

(30) Foreign Application Priority Data

May 30, 2012 (KR) .................. 10-2012-0057602

(51) Int. Cl.
| | | |
|---|---|---|
| *C09J 7/02* | (2006.01) | |
| *C09J 7/29* | (2018.01) | |
| *C09J 133/06* | (2006.01) | |
| *C09J 175/04* | (2006.01) | |
| *B32B 27/40* | (2006.01) | |
| *C08G 18/62* | (2006.01) | |
| *C08G 18/76* | (2006.01) | |
| *C08G 18/80* | (2006.01) | |
| *C09J 7/38* | (2018.01) | |
| *C08K 5/37* | (2006.01) | |

(52) U.S. Cl.
CPC ............... *C09J 7/29* (2018.01); *B32B 27/40* (2013.01); *C08G 18/6229* (2013.01); *C08G 18/7621* (2013.01); *C08G 18/8029* (2013.01); *C09J 7/385* (2018.01); *C09J 133/066* (2013.01); *C09J 175/04* (2013.01); *C08K 5/37* (2013.01); *C09J 2201/122* (2013.01); *C09J 2201/16* (2013.01); *C09J 2201/602* (2013.01); *C09J 2201/606* (2013.01); *C09J 2203/318* (2013.01); *C09J 2203/326* (2013.01); *C09J 2205/102* (2013.01); *C09J 2400/163* (2013.01); *C09J 2433/00* (2013.01); *Y10T 428/2848* (2015.01); *Y10T 428/2891* (2015.01); *Y10T 428/31938* (2015.04); *Y10T 442/10* (2015.04)

(58) Field of Classification Search
None
See application file for complete search history.

(56) References Cited

U.S. PATENT DOCUMENTS

| | | | | | |
|---|---|---|---|---|---|
| 4,565,854 | A | * | 1/1986 | Sato | ............ C08F 2/38 526/214 |
| 5,225,472 | A | * | 7/1993 | Cameron | ............ C07C 321/14 524/368 |
| 9,550,926 | B2 | * | 1/2017 | Park | ............ C09J 133/12 |
| 9,823,763 | B2 | * | 11/2017 | Park | ............ G06F 3/0412 |
| 2010/0167050 | A1 | * | 7/2010 | Husemann | ............ C08F 20/12 428/355 AC |
| 2012/0040103 | A1 | * | 2/2012 | Keledjian | ............ C08L 81/02 427/515 |
| 2013/0005910 | A1 | | 1/2013 | Okamoto et al. | |
| 2013/0202884 | A1 | | 8/2013 | Park et al. | |

FOREIGN PATENT DOCUMENTS

| | | | |
|---|---|---|---|
| CN | 1572852 A | 2/2005 | |
| CN | 1745439 A | 3/2006 | |
| CN | 101407705 A | 4/2009 | |
| EP | 1491604 A1 | 12/2004 | |
| EP | 1574557 A1 * | 9/2005 | ............ B32B 7/12 |
| EP | 1829947 A2 | 9/2007 | |
| EP | 2402407 A1 * | 1/2012 | ............ C08F 220/18 |
| EP | 2551320 A1 | 1/2013 | |
| JP | 2004-263165 A | 9/2004 | |
| JP | 2007-262380 | 10/2007 | |
| JP | 2008-222814 | 9/2008 | |
| JP | 2010-121009 A | 6/2010 | |
| JP | 2010-195942 A | 9/2010 | |
| JP | 2010-206062 A | 9/2010 | |
| KR | 10-2007-0063365 | 6/2007 | |
| KR | 10-2009-0037339 | 4/2009 | |
| KR | 10-2011-0034556 | 4/2011 | |
| KR | 10-2011-0069277 | 6/2011 | |

(Continued)

OTHER PUBLICATIONS

Moriyama, Hidemichi et al., "Self-Adhesion Adhesive and Self-Adhesion Adhesive Tape Using It", Machine translation of JP 2008-222814A, published on Sep. 25, 2008.*

(Continued)

*Primary Examiner* — Anish P Desai

(74) *Attorney, Agent, or Firm* — Dentons US LLP

(57) ABSTRACT

The present invention is relates to conductive laminate. The conductive laminate is applied to a touch panel or touch screen, thereby exhibiting excellent durability, and a pressure-sensitive adhesive layer included in the conductive laminate may prevent a change in resistance of a conductive layer, and effectively inhibit lift-off or peeling, or generation of bubbles at a pressure-sensitive adhesive interface. As a result, performances of the touch panel or touch screen including the conductive laminate may be stably maintained for a long time.

14 Claims, 3 Drawing Sheets

(56) References Cited

FOREIGN PATENT DOCUMENTS

| KR | 10-2012-0041133 A | 4/2012 | | |
|----|-------------------|--------|---|---|
| KR | 10-2012-0041134   | 4/2012 | | |
| WO | 2011118181 A1     | 9/2011 | | |
| WO | 2011118183 A1     | 9/2011 | | |
| WO | 2012/053830 A2    | 4/2012 | | |
| WO | 2012/053831       | 4/2012 | | |
| WO | WO 2013012274 A3 * | 4/2013 | ............ | C09J 133/12 |

OTHER PUBLICATIONS

Yoshioka, Tadashi et al., "Conductive Film, and Filter for Display", Machine translation of JP 2010-206062A, published on Sep. 16, 2010.*

Product data sheet "2-Mercaptoethanol", Sigma-Aldrich, retrieved on Aug. 15, 2017.*

Aukkaravittayapun S. et al.: "Flexible Transparent Conducting Film by Hot Embossing", Key Engineering Materials vols. 447-448, pp. 710-714, XP002749105.

* cited by examiner

[FIG. 1]
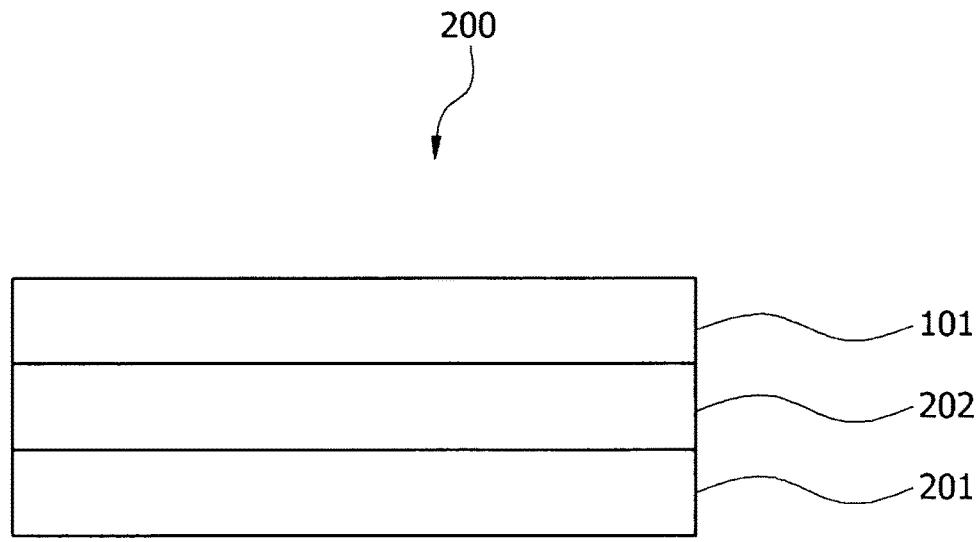
[FIG. 2]
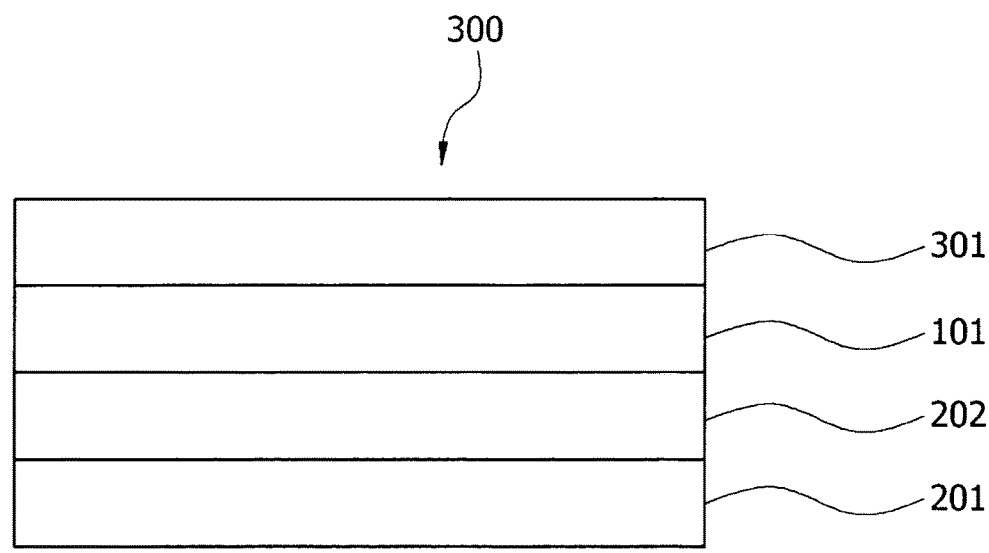

[FIG. 3]
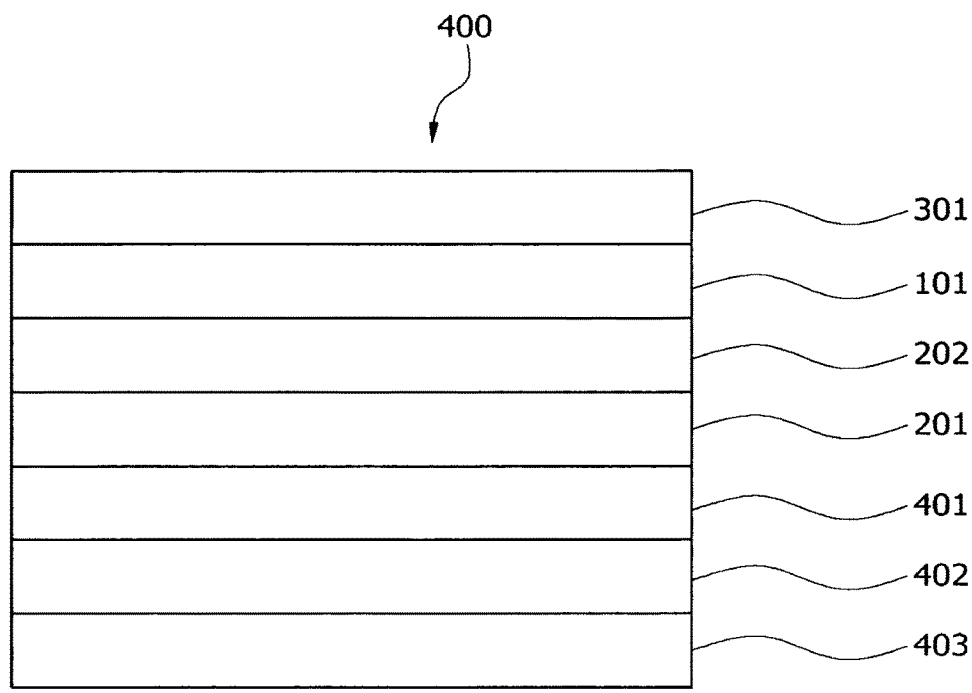

[FIG. 4]
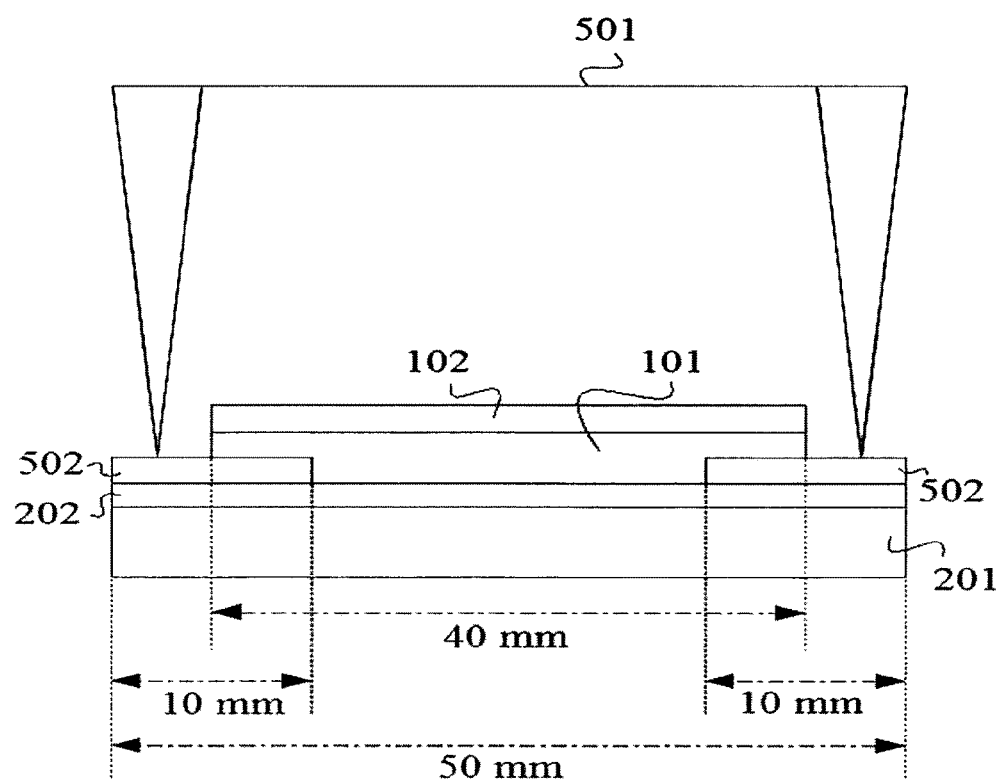

CONDUCTIVE LAMINATE, AND TOUCH PANEL COMPRISING SAME

This application is a Continuation Bypass of International Application No. PCT/KR2013/004772, filed May 30, 2013, and claims the benefit of Korean Application No. 10-2012-0057602, filed on May 30, 2012, all of which are hereby incorporated by reference in their entirety for all purposes as if fully set forth herein.

TECHNICAL FIELD

The present invention relates to a conductive laminate and a touch panel including the same.

BACKGROUND ART

A touch panel or touch screen is applied to various data processing terminals such as a mobile communication terminal or ATM, or displays such as a TV or monitor. In addition, as the touch panel or touch screen is increasingly applied to compact portable electronic devices, the demand for a more compact and lighter touch panel or touch screen is increasing.

During application of a part constituting a touch panel or touch screen, for example, a conductive film, a pressure-sensitive adhesive may be used. Such a pressure-sensitive adhesive is required to maintain optical transparency under severe conditions such as a high temperature or high temperature and high humidity condition. In addition, it is also required to have durability to prevent lift-off or peeling occurring at a pressure-sensitive adhesive interface.

In addition, according to the structure of a touch panel or touch screen, a pressure-sensitive adhesive may be directly attached to a conductive layer such as an indium tin oxide (ITO) layer or a metal mesh layer. In this case, when the pressure-sensitive adhesive stably inhibits a resistance change of the conductive layer, a touch panel or screen may be stably driven for a long time.

DISCLOSURE

Technical Problem

The present invention is directed to providing a conductive laminate and a touch panel including the same.

Technical Solution

The present invention relates to a conductive laminate. In one example, the conductive laminate includes a substrate layer, and a pressure-sensitive adhesive layer formed on one or both surfaces of the substrate layer. The pressure-sensitive adhesive layer is formed from a pressure-sensitive adhesive composition including 100 parts by weight of a pressure-sensitive adhesive polymer and 0.1 to 35 parts by weight of a polymerized product of a monomer mixture including a thiol compound having a weight average molecular weight of 1,000 to 200,000. In addition, the conductive laminate may include a conductive laminate for a touch panel or touch screen. The term "conductive laminate for a touch panel or touch screen" may be a conductive laminate including a pressure-sensitive adhesive layer formed on one or both surfaces of a conductive film having a conductive layer on one or both surfaces thereof.

A substrate layer included in the conductive laminate may use an optically transparent glass substrate layer or plastic substrate layer. As the plastic substrate layer, for example, a polyester substrate layer, a polyamide substrate layer, a polyvinyl chloride substrate layer, a polystyrene substrate layer, or a polyolefin substrate layer formed of, for example, polyethylene or polypropylene may be used, but the present invention is not limited thereto. In addition, the plastic substrate layer may be a non-stretched or a uniaxial or biaxial stretched substrate layer. One or both surfaces of the substrate layer may be subject to suitable treatment such as corona discharging treatment, UV radiation treatment, plasma treatment, or sputter etching treatment to enhance cohesiveness of the pressure-sensitive adhesive layer or a conductive layer to be described layer. Such a substrate layer may have a thickness of, for example, about 3 μm to 300 μm, 5 μm to 250 μm, or 10 μm to 200 μm, but the present invention is not limited thereto.

When the pressure-sensitive adhesive layer included in the conductive laminate is formed as a pressure-sensitive adhesive on a polycarbonate (PC) film, it may have a peeling strength with respect to the PC film of 1,900 gf/25 mm or more, 2,000 gf/25 mm or more, 2,100 gf/25 mm or more, 2,200 gf/25 mm or more, or 2,300 gf/25 mm or more at a room temperature. The peeling strength is measured by an evaluation method to be described in the following Example at a peeling angle of 180° and a peeling rate of 300 mm/min. In such a range of the peeling strength, when the conductive laminate is applied to a touch panel or touch screen, durability and a bubbling preventing effect may be stably maintained, and lift-off and peeling may also be prevented. As the peeling strength gets higher, more excellent durability, prevention of bubbling, lift-off, and peeling may be obtained. The upper limit of the peeling strength may be, but is not particularly limited to, 5,000 gf/25 mm or more, or 10,000 gf/25 mm or more.

In addition, the pressure-sensitive adhesive layer included in the conductive laminate may include a pressure-sensitive adhesive polymer. The pressure-sensitive adhesive polymer shows a pressure-sensitive adhesive property, and may be any one of optically transparent polymers. In one example, the pressure-sensitive adhesive polymer may be an acrylic polymer. As an acrylic polymer that can be used as a pressure-sensitive adhesive polymer, any one of various acrylic polymers known in the art may be used without limitation.

The acrylic polymer may include, for example, a (meth)acrylic acid ester monomer. For example, the monomer may be included in the acrylic polymer as a polymerization unit. The "monomer is included in the polymer as a polymerization unit" used herein may refer that the monomer forms a backbone, for example, a main or side chain, of the polymer through polymerization.

As the (meth)acrylic acid ester monomer, for example, alkyl (meth)acrylate may be included. In addition, in consideration of a cohesive strength, a glass transition temperature, and a pressure-sensitive adhesive property, for example, an alkyl (meth)acrylate having an alkyl group having 1 to 14 carbon atoms may be included. Such a monomer may be, but is not limited to, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, isobornyl (meth)acrylate, lauryl (meth)acrylate, or tetradecyl (meth)acrylate, which may be one or a mixture of at least two thereof.

The acrylic polymer may further include a copolymerizable monomer having a crosslinkable functional group. The monomer may be copolymerized with another monomer included in the acrylic polymer such as a (meth)acrylic acid ester monomer, and provide a crosslinking point to the acrylic polymer due to a crosslinkable functional group. As the copolymerizable monomer having a crosslinkable functional group, for example, a monomer having a part capable of being copolymerized with another monomer such as the (meth)acrylic acid ester monomer, and having a crosslinkable functional group may be used. As the crosslinkable functional group, for example, a hydroxyl group, a carboxyl group, an isocyanate group, a glycidyl group, or a derivative thereof may be used. In the field of preparing a pressure-sensitive adhesive, various copolymerizable monomers having the crosslinkable functional group are known, and a suitable one may be selected therefrom. For example, a copolymerizable monomer having a hydroxyl group or a carboxyl group as a representative crosslinkable functional group may be a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate, or 8-hydroxyoctyl (meth)acrylate; a hydroxyalkyleneglycol (meth)acrylate such as 2-hydroxyethyleneglycol (meth)acrylate or 2-hydroxypropyleneglycol (meth)acrylate; or a carboxylic acid or a derivative thereof such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, or maleic anhydride, but the present invention is not limited thereto.

For example, the pressure-sensitive adhesive polymer may include 80 to 99.99 parts by weight of a (meth)acrylic acid ester monomer, and 0.01 to 20 parts by weight of a copolymerizable monomer having a crosslinkable functional group in consideration of the cohesive strength, glass transition temperature, or pressure-sensitive adhesive property. The unit "parts by weight" used herein refers to, unless particularly defined otherwise, a weight ratio between components.

In addition, the acrylic polymer may further include another arbitrary comonomer when necessary. The monomer may be included in the acrylic polymer as a polymerization unit. As an arbitrary comonomer, for example, a nitrogen-containing monomer such as (meth)acrylonitrile, (meth)acrylamide, N-methyl (meth)acrylamide, N-butoxy methyl (meth)acrylamide, N-vinyl pyrrolidone, or N-vinyl caprolactam; an alkyleneoxide group-containing monomer such as alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, alkoxy polyethyleneglycol (meth)acrylic acid ester, phenoxy alkyleneglycol (meth)acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester, or phenoxy polyalkyleneglycol (meth)acrylic acid ester; a styrene-based monomer such as styrene or methyl styrene; a glycidyl group-containing monomer such as glycidyl (meth)acrylate; or a carboxylic acid vinyl ester such as vinyl acetate may be used, but the present invention is not limited thereto. At least one or two of such comonomers may be suitably selected as necessary and included in the polymer. In addition, in one example, the comonomer may be included in the acrylic polymer, for example, at 20 parts by weight or less, or 0.1 to 15 parts by weight with respect to weights of other monomers.

The acrylic polymer may be prepared through a conventional polymerization method. For example, the acrylic polymer may be prepared by applying a monomer mixture prepared by blending a necessary monomer according to the composition of a desired monomer to the polymerization method such as solution polymerization, photo polymerization, bulk polymerization, suspension polymerization, or emulsion polymerization. When necessary in the manufacturing process, a suitable polymerization initiator or a molecular weight controller, or a chain transfer agent may be used together.

The pressure-sensitive adhesive polymer may have a weight average molecular weight (Mw) of, for example, 300,000 to 2,000,000, 400,000 to 1,750,000, or 500,000 to 1,500,000. The "weight average molecular weight" used herein may refer to a conversion value with respect to standard polystyrene measured by gel permeation chromatography (GPC). Unless particularly defined otherwise, the term "molecular weight" used herein may refer to a weight average molecular weight. When the weight average molecular weight of the pressure-sensitive adhesive polymer is controlled within a range of 300,000 to 2,000,000, the pressure-sensitive adhesive property, durability, cohesiveness, and coating property of the pressure-sensitive adhesive layer may be stably maintained.

In addition, the pressure-sensitive adhesive layer included in the conductive laminate may include a low molecular weight polymer, which is a polymerized product of a monomer mixture including a thiol compound. A molecular weight of the low molecular weight polymer may be, for example, 1,000 to 200,000, 2,000 to 150,000, 3,000 to 100,000, 4,000 to 50,000, or 5,000 to 10,000, but the present invention is not limited thereto.

The low molecular weight polymer may prevent a change in resistance of the conductive layer when the pressure-sensitive adhesive layer is in contact with the conductive layer. In addition, when the pressure-sensitive adhesive layer is in contact with a plastic substrate layer, bubbles generated at a pressure-sensitive adhesive interface due to an oligomer or gas in the substrate layer may be prevented. In addition, due to the low molecular weight polymer, the above-described pressure-sensitive adhesive polymer may increase the degree of freedom in the polymerization of the acrylic polymer, and odor generated due to the thiol compound may be removed. In addition, the physical properties, for example, an adhesive property or repeelability of the pressure-sensitive adhesive layer may be controlled by controlling a glass transition temperature of the low molecular weight polymer, compared with that of the acrylic polymer. When the glass transition temperature of the low molecular weight polymer is lower than that of the acrylic polymer, repeelability, wettability, and an initial attachment property among the physical properties of the pressure-sensitive adhesive layer may be enhanced, and when the glass transition temperature of the low molecular weight polymer is higher than that of the acrylic polymer, the pressure-sensitive adhesive layer serves as a pressure-sensitive adhesive providing agent, and thus the adhesive strength thereof after curing is enhanced.

The thiol compound may be, for example, a compound of Formula 1.

  [Formula 1]

In Formula 1, R is an alkyl group unsubstituted or substituted with at least one substituent selected from the group consisting of a thiol group, a hydroxyl group, and an oxyranyl group, or a substituent of Formula 2.

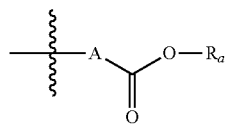

[Formula 2]

In Formula 2, A is an alkylene group, Ra is hydrogen, an alkyl group, or $-L_1-C(-L_2-O-C(=O)-L_3-SH)_nR_{(3-n)}$, in which $L_1$ to $L_3$ are each independently an alkylene group, R is hydrogen or an alkyl group, and n is a number from 1 to 3, and ⁃ξ⁃ may mean that A in Formula 2 is linked to a sulfur (S) atom of Formula 1.

In Formula 1 or 2, an alkyl group may be an alkyl group having 1 to 20, 1 to 16, 1 to 12, 1 to 8, or 1 to 4 carbon atoms. The alkyl group may be, for example, linear, branched or cyclic. In addition, when needed, other than a hydroxyl group or oxyranyl group, the alkyl group may be substituted with an arbitrary substituent.

In addition, in Formula 1 or 2, an alkylene group may be an alkylene group having, for example, 1 to 20, 1 to 15, 1 to 12, 1 to 8, or 1 to 4 carbon atoms. The alkylene group may be, for example, linear, branched or cyclic. In addition, when needed, the alkylene group may be substituted with an arbitrary substituent.

The thiol compound may be, for example, a compound in which R in Formula 1 is a linear or branched alkyl group having 1 to 20, 1 to 16, 3 to 16, 5 to 16, 7 to 16, or 7 to 17 carbon atoms; a compound in which R is the same as the alkyl group described above, which is substituted with at least one hydroxyl group or oxyranyl group; or a compound in which R is the substituent of Formula 2, and in Formula 2, A is a linear or branched alkylene group having 1 to 8 or 1 to 4 carbon atoms, $R_a$ is a hydrogen atom, a linear or branched alkyl group having 4 to 12 or 4 to 8 carbon atoms, or $-L_1-C(-L_2-O-C(=O)-L_3-SH)_nR_{(3-n)}$, $L_1$ to $L_3$ are each independently a linear or branched alkylene group having 1 to 8 or 1 to 4 carbon atoms, R is a linear or branched alkyl group having 1 to 8 or 1 to 4 carbon atoms, and n is 2 or 3, but the present invention is not limited thereto.

In one example, the thiol compound may be, but is not limited to, 2-mercapto ethanol, glycidyl mercaptan, mercaptoacetic acid, 2-ethylhexylthioglycolate, 2,3-dimercapto-1-propanol, n-dodecane thiol, t-butyl mercaptan, n-butyl mercaptan, 1-octadecane thiol, trimethylol propane tris(3-mercapto propionate), or pentaerythritol tetrakis(3-mercapto propionate).

In addition, the thiol compound may be included, for example, at 0.01 to 10, 0.1 to 9, 1 to 8, 3 to 7, or 4 to 6 parts by weight, relative to 100 parts by weight of a monomer of the monomer mixture. When the ratio of the thiol compound is controlled within a range of 0.01 to 10 parts by weight, suitable production of the low molecular weight polymer may be induced, and an effect caused by the addition may be ensured.

The kind of the monomer included in the monomer mixture is not particularly limited. In one example, the monomer mixture may include a (meth)acrylic acid ester monomer which is a monomer included in the acrylpolymer, or a copolymerizable monomer having a crosslinkable functional group. When the monomer mixture includes all the monomers, the mixture may include 80 to 99.99 parts by weight of the (meth)acrylic acid ester monomer and 0.01 to 20 parts by weight of the copolymerizable monomer having a crosslinkable functional group, but the present invention is not limited thereto. The monomer mixture may further include another arbitrary comonomer, for example, the above-described nitrogen-containing monomer, alkyleneoxide group-containing monomer, styrene-based monomer, glycidyl group-containing monomer, or carboxylic acid vinyl ester in a suitable ratio when needed.

The low molecular weight material may be prepared by a polymerization method such as solution polymerization, photo polymerization, bulk polymerization, suspension polymerization, or emulsion polymerization.

In addition, in one example, the low molecular weight material may be included in the pressure-sensitive adhesive layer at 0.1 to 35, 0.2 to 34, 0.3 to 33, or 0.4 to 32 parts by weight, relative to 100 parts by weight of the pressure-sensitive adhesive polymer such as the acrylic polymer. When the content of the low molecular weight material is controlled within a range of 0.1 to 35 parts by weight, an effect of addition of the low molecular weight material may be ensured, and durability of the pressure-sensitive adhesive layer may be excellently maintained.

The pressure-sensitive adhesive layer included in the conductive laminate may further include a multifunctional crosslinking agent. The multifunctional crosslinking agent is a compound having at least two functional groups capable of reacting with a crosslinking point included in, for example, the acrylic polymer or low molecular weight material, which may serve to realize a crosslinking structure in a pressure-sensitive adhesive composition.

In addition, as the multifunctional crosslinking agent, without particular limitation, a known crosslinking agent such as an isocyanate crosslinking agent, an epoxy crosslinking agent, an aziridine crosslinking agent, or a metal chelate crosslinking agent may be used, and in one example, as a multifunctional crosslinking agent, a conventional isocyanate crosslinking agent may be used, but the present invention is not limited thereto. As the isocyanate crosslinking agent, for example, a diisocyanate compound such as tolylene diisocyanate, xylene diisocyanate, diphenylmethane diisocyanate, hexamethylene diisocyanate, isoboron diisocyanate, tetramethylxylene diisocyanate, or naphthalene diisocyanate, or a compound prepared by reacting the diisocyanate compound with a polyol may be used. Here, the polyol may be, for example, trimethylol propane, but the present invention is not limited thereto.

In one example, the multifunctional crosslinking agent may be included in the pressure-sensitive adhesive composition at 0.01 to 10, 0.05 to 5, or 0.1 to 1 parts by weight, relative to 100 parts by weight of the pressure-sensitive adhesive polymer such as the acrylic polymer. When the content of the multifunctional crosslinking agent is controlled within a range from 0.01 to 10 parts by weight, required physical properties of the pressure-sensitive adhesive layer may be excellently maintained.

In addition, the pressure-sensitive adhesive layer included in the conductive laminate may further include an additive such as a silane coupling agent, a pressure-sensitive adhesive providing agent, an epoxy resin, a UV stabilizer, an antioxidant, a coloring agent, a reinforcing agent, a filler, a foaming agent, an interface activating agent, or a plasticizer when needed.

In one example, the conductive laminate may further include a conductive layer present between the substrate layer and the pressure-sensitive adhesive layer. FIG. 1 is a cross-sectional view of an exemplary conductive laminate (200), which shows a state in which a pressure-sensitive adhesive layer (101), a conductive layer (202), and a substrate layer (201) are sequentially included. The conductive layer may be formed by additionally forming a film including a conductive layer-forming material on one surface of the substrate layer through vapor deposition, sputtering, ion plating, spray pyrolysis, chemical plating, or electroplating.

The conductive layer-forming material may be suitably selected by forming a transparent conductive layer, and for example, the conductive layer may a metal such as gold, silver, platinum, palladium, copper, aluminum, nickel, chromium, titanium, iron, cobalt, tin, or an alloy of at least two thereof, a metal oxide such as indium oxide, tin oxide, titanium oxide, cadmium oxide, or a mixture of at least two thereof, or a metal compound such as copper iodide. In addition, the conductive layer may be, for example, a crystal film or a non-crystal film, but the present invention is not limited thereto.

In one example, the conductive layer may be a crystal film including indium tin oxide (ITO). The ITO crystal film may include indium oxide as a main component, and may be formed of a complex oxide including at least one of oxides having a large band gap such as tin oxide, zinc oxide, antimony oxide, aluminum oxide, calcium oxide, cerium oxide, magnesium oxide, cadmium oxide, copper oxide, tungsten oxide, and rhenium oxide. In addition, the ITO crystal film may include, for example, 2.5 wt % to 25 wt % or 7.5 wt % to 17.5 wt % of tin oxide based on indium oxide formed by sputtering using a target having indium oxide and tin oxide as main components, and such a crystal film is advantageous in enhancement of resistance and transmittance. In addition, the ITO crystal film may include, for example, 85 wt % to 95 wt % of indium oxide and 5 wt % to 15 wt % of tin oxide in consideration of the resistance and the transmittance.

A thickness of the conductive layer may be determined in consideration of, for example, flexibility, continuity, transparency, and resistance required according to a use of the conductive laminate, and conventionally selected in the range from 10 nm to 300 nm or 20 nm to 200 nm.

When the conductive laminate includes a conductive layer, for example, an ITO conductive layer, a resistance change rate may be 10% or less, 9% or less, or 8% or less. Here, the resistance change rate is a value calculated by Equation 1 through a method to be described in Example.

$$\Delta R = [(R_a - R_i)/R_i] \times 100 \qquad \text{[Equation 1]}$$

In Equation 1, $\Delta R$ is a resistance change rate, $R_i$ is an initial resistance of the ITO conductive layer at the time when the pressure-sensitive adhesive layer is attached to the ITO conductive layer formed on one surface of the conductive laminate, and $R_a$ is a resistance of the ITO conductive layer measured after the conductive laminate in which the pressure-sensitive adhesive layer is attached on the ITO conductive layer was maintained for 240 hours at a temperature of 60° C. and a relative humidity of 90%.

When the conductive layer has the above resistance change rate, a product to which the conductive laminate is applied, for example, a touch panel or touch screen, may be stably driven for a long time. The resistance change rate is preferable to be decreased, that is, a change in resistance is preferable not to be induced. The lower limit of the resistance change rate is not limited, and may be, for example, 0.001%, 0.01% or 0.1%.

In addition, in one example, the conductive laminate may further include a metal mesh layer present between the substrate layer and the pressure-sensitive adhesive layer. The metal mesh layer may include silver, copper, or an alloy thereof, but the present invention is not limited thereto. When the ITO conductive layer is used by controlling the conductive laminate to include the metal mesh layer, production costs of the conductive laminate may be reduced compared with when an ITO conductive layer is used, the resistance may be efficiently reduced, and a touch function may be easily applied to a large-sized screen.

In addition, the conductive laminate may further include a transparent substrate. The transparent substrate may be attached to the substrate layer by, for example, the pressure-sensitive adhesive layer. FIG. 2 is an example of the conductive laminate (300) further including a transparent substrate (301). As the transparent substrate, a glass substrate or an optically transparent plastic substrate may be used.

In addition, the conductive laminate may be formed in a structure shown in FIG. 3. FIG. 3 shows that a second pressure-sensitive adhesive layer (401), a second conductive layer (402), and a second substrate layer (403) are further included under the substrate layer (201) in the structure of FIG. 2. The conductive laminate having the structure of FIG. 3 may be applied to a touch panel or screen requiring a multi-touch function. In the structure of FIG. 3, to the additional second pressure-sensitive adhesive layer (401), the second conductive layer (402), and the second substrate layer (403), for example, the above descriptions of the pressure-sensitive adhesive layer, the conductive layer, and the substrate layer may be applied.

The conductive laminate may be manufactured by, for example, forming the above-described pressure-sensitive adhesive layer on the substrate layer.

The substrate layer may have a conductive layer formed on one surface thereof, and the pressure-sensitive adhesive layer may be formed on the conductive layer. A method of forming the conductive layer when the conductive layer is the above-described ITO crystal film may include forming a conductive layer on one surface of a substrate layer by sputtering, and thermal-treating the substrate layer on which the conductive layer is formed.

Here, a sputtering method to form the conductive layer is not particularly limited, and may be a conventional method known in the art. In one example, the sputtering may be DC magnetron sputtering.

The thermal treatment may be performed, for example, at 100° C. to 200° C. for about 30 minutes to 12 hours. According to the above-described thermal treatment, the conductive layer may be crystallized, and generation of carriers in the film may be stimulated. By the thermal treatment in the above conditions, transition of crystal particles in the crystal film and a scattering factor of the carrier, which is a defect, is reduced, thereby facilitating the generation of carriers. The thermal treatment temperature may be a temperature of an object to be treated, which may be, for example, 100° C. to 200° C. or 120° C. to 180° C., but the present invention is not limited thereto. In addition, the thermal treatment time may be, for example, 30 minutes to 12 hours or 30 minutes to 5 hours, but the present invention is not limited thereto. Sufficient crystallization may be performed at a thermal treatment temperature of 100° C. or more for 30 minutes or more, and practical productivity and production costs may be ensured by performing the crystallization at a thermal treatment temperature of 200° C. or less for 12 hours or less.

In addition, the thermal treatment may be performed in the presence of oxygen. The thermal treatment may be performed even with a very small amount of existing oxygen, for example, with an amount of oxygen existing after conventional exchange of nitrogen or argon gas is performed. According to the above-described thermal treatment, the ITO crystal film may be grown, and a resistivity of the conductive layer may also be suitably maintained.

The operation of forming the conductive layer may be performed on a lower coating layer in a state in which the lower coating layer is previously formed on the substrate layer.

A method of forming the pressure-sensitive adhesive layer on the substrate layer is not particularly limited, and, for example, the pressure-sensitive adhesive layer may be formed on the substrate layer due to a crosslinking structure directly realized in the pressure-sensitive adhesive layer, or may be formed first on a different substrate layer and then laminated on the substrate layer.

A method of realizing a crosslinking structure in the pressure-sensitive adhesive layer is not particularly limited, either and thus may include maintaining the acrylic polymer and a multifunctional crosslinking agent at a suitable temperature to induce a crosslinking reaction.

Another aspect of the present invention provides a touch panel or touch screen. In one example, the touch panel or touch screen may include the conductive laminate. In addition, the touch panel or touch screen may be, for example, a capacitive or resistive touch panel or touch screen. The touch panel or touch screen may be manufactured by a known method in the art including the conductive laminate, and a structure thereof is not particularly limited.

Advantageous Effects

A conductive laminate according to the present invention is applied to a touch panel or touch screen, thereby exhibiting excellent durability, and a pressure-sensitive adhesive layer included in the conductive laminate can prevent a change in resistance of a conductive layer, and effectively inhibit lift-off or peeling, or generation of bubbles at a pressure-sensitive adhesive interface. As a result, performances of the touch panel or touch screen including the conductive laminate can be stably maintained for a long time.

BRIEF DESCRIPTION OF DRAWINGS

FIGS. 1 to 3 are diagrams of exemplary conductive laminates.

FIG. 4 is a diagram showing a method of measuring a resistance change rate.

MODES OF INVENTION

Hereinafter, exemplary embodiments of the present invention will be described in detail. However, the present invention is not limited to the embodiments disclosed below, but can be implemented in various forms. The following embodiments are described in order to enable those of ordinary skill in the related art to embody and practice the present invention.

Hereinafter, each physical properties shown in Examples and Comparative Examples were evaluated by the following methods.

1. Durability Test

A sample was prepared by laminating a hard coating layer of a poly(ethylene terephthalate)(PET) film (thickness: 100 μm) and a polycarbonate(PC) film (thickness: 1 mm) by means of a pressure-sensitive adhesive layer of Example or Comparative Example, cutting the resulting product to a size of 50 mm (width)×100 mm (length), and putting the cut product in an autoclave at 60° C. under 5 atm for 30 minutes. Afterward, the sample was left at 80° C. for about 240 hours, and then durability was evaluated.

The durability was evaluated by examining whether or not generation of bubbles and occurrence of lift-off/peeling according to the following criteria:

<Criteria for Evaluating Bubble Generation>

O: When bubbles were not observed or a small amount of bubbles having a diameter of 100 μm or less were observed at a pressure-sensitive adhesive interface using an optical microscope X: When bubbles having a diameter of 100 μm or more, or groups of bubbles having a diameter of 100 μm or less were observed at a pressure-sensitive adhesive interface using an optical microscope <Criteria for Evaluating Lift-off/Peeling>

O: When there was no lift-off and peeling at a pressure-sensitive adhesive interface X: When lift-off and/or peeling occurred at a pressure-sensitive adhesive interface 2. Resistance Change Rate Test A resistance change rate was measured by the method shown in FIG. 5. As a commercially available conductive film, a PET film (201) (hereinafter, referred to as a "conductive PET") having an ITO conductive layer (202) formed on one surface thereof was cut into a size of 30 mm×50 mm (width×length). Subsequently, as shown in FIG. 5, a silver paste (502) was applied to both ends of the film to have a width of 10 mm, and plasticized at 150° C. for 30 minutes. A double-sided pressure-sensitive adhesive tape having releasing films (102) attached to both surfaces thereof, which was manufactured in Example or Comparative Example, was cut into a size of 30 mm×40 mm (width×length), and the releasing film was removed from one surface of the pressure-sensitive adhesive tape, and then a pressure-sensitive adhesive layer (101) was attached to the conductive layer (202) by matching a center of the pressure-sensitive adhesive layer (101) with a center of the PET film (201). Then, an initial resistance $R_i$ of the conductive layer (202) was measured using a resistance measurer (501). After measuring the initial resistance, the sample having the structure shown in FIG. 5 was maintained at 60° C. and a relative humidity of 90% for 240 hours, and a resistance $R_a$ of the conductive layer (202) was measured using the same measurer (501) used above. The measured value was put into Equation 1 to measure a resistance change rate ΔR.

$$\Delta R = [(R_a - R_i)/R_i] \times 100 \quad [\text{Equation 1}]$$

3. Evaluation of Peeling Strength

A double-sided pressure-sensitive adhesive tape of Example or Comparative Example was cut to have a width of 1 inch, and attached to a PC film by pressing the tape twice with a 2 kg roller. After about 30 minutes of the attachment, a peeling strength was measured while the pressure-sensitive adhesive tape was peeled in a width direction at a peeling angle of 180° and a peeling rate of 300 mm/min. A peeling strength of each pressure-sensitive adhesive tape was measured three times by the same method, and an average of the measured peeling strengths was used as a representative value.

4. Measurement of Molecular Weight (Mw)

A molecular weight was measured using a GPC apparatus under the following conditions. To prepare a calibration curve, measurement results were converted using standard polystyrene produced by Agilent System.

<Conditions for Measuring Molecular Weight (Mw)>
Measurer: Agilent GPC (Agilent 1200 series, USA)
Column: Two PL Mixed Bs connected
Column Temperature: 40° C.
Eluent: Tetrahydrofuran (THF)
Flow Rate: 1.0 mL/min
Concentration: Up to 2 mg/mL (100 μl injection)

Preparation Example 1: Preparation of Acrylic Polymer Solution (A)

58 parts by weight of n-butyl acrylate, 40 parts by weight of methyl acrylate, and 2 parts by weight of 2-hydroxyethyl acrylate were put into a reaction vessel in which a nitrogen gas was refluxed and a cooling apparatus was equipped to facilitate temperature control. Subsequently, 200 parts by weight of ethyl acetate was added as a solvent with respect to 100 parts by weight of a monomer. The reaction vessel was purged with a nitrogen gas for about 60 minutes, a temperature was maintained at about 60° C., and 0.04 parts by weight of azobisisobutyronitrile(AIBN) was input as a reaction initiator to initiate a reaction. After about 8 hours of the reaction, a reaction product was diluted with ethyl acetate to have a solid content of about 30 wt %, thereby obtaining an acrylic polymer solution (A) having a weight average molecular weight (Mw) of about 800,000 and a polydispersity index ($M_w/M_n$) of about 5.2.

Preparation Example 2: Preparation of Acrylic Low Molecular Weight Polymer Solution (B)

58 parts by weight of n-butyl acrylate, 40 parts by weight of methyl acrylate, and 2 parts by weight of 2-hydroxyethyl acrylate were put into the reaction vessel as used in Preparation Example 1, and 100 parts by weight of ethyl acetate was put thereinto as a solvent with respect to 100 parts by weight of the monomer. The reaction vessel was purged with a nitrogen gas for about 60 minutes, a temperature was maintained at about 60° C., and 5 parts by weight of N-dodecane thiol was put with respect to 100 parts by weight of the monomer. In addition, 0.04 parts by weight of azobisisobutyronitrile(AIBN) was input as a reaction initiator with respect to 100 parts by weight of the monomer to initiate a reaction. After about 8 hours of the reaction, a reaction product was diluted with ethyl acetate to have a solid content of about 30 wt %, thereby obtaining a low molecular weight polymer solution (B) having a weight average molecular weight (Mw) of about 6,000 and a polydispersity index ($M_w/M_n$) of about 1.8.

Preparation Example 3: Preparation of Acrylic Polymer Solution (C)

58 parts by weight of n-butyl acrylate, 40 parts by weight of methyl acrylate, and 2 parts by weight of 2-hydroxyethyl acrylate were put into the reaction vessel as used in Preparation Example 1, and 150 parts by weight of ethyl acetate was put thereinto as a solvent with respect to 100 parts by weight of the monomer. The reaction vessel was purged with a nitrogen gas for about 60 minutes, a temperature was maintained at about 60° C., and 0.03 parts by weight of N-dodecane thiol was put with respect to 100 parts by weight of the monomer. In addition, 0.04 parts by weight of azobisisobutyronitrile(AIBN) was put as a reaction initiator with respect to 100 parts by weight of the monomer to initiate a reaction. After about 8 hours of the reaction, a reaction product was diluted with ethyl acetate to have a solid content of about 30 wt %, thereby obtaining a polymer solution (C) having a weight average molecular weight (Mw) of about 780,000 and a polydispersity index ($M_w/M_n$) of about 2.8.

Example 1

The acrylic polymer solution (A) of Preparation Example 1, the acrylic low molecular weight polymer solution (B) of Preparation Example 2, and an isocyanate crosslinking agent (toluene diisocyanate (TDI)) were blended, thereby obtaining a pressure-sensitive adhesive composition. The polymer solution(B) was blended to have solid content in the solution (B) of 0.5 parts by weight, relative to 100 parts by weight of the solid content in the solution (A), and the crosslinking agent was blended at 0.3 parts by weight, relative to 100 parts by weight of the solid content in the solution(A). The pressure-sensitive adhesive composition was coated on a releasing-treated surface of a releasing-treated PET film (thickness: about 50 μm), and the coated product was left at about 120° C. for about 3 minutes, thereby forming a transparent pressure-sensitive adhesive layer having a thickness of about 50 μm. Subsequently, a releasing-treated surface of another releasing-treated PET Film (thickness: about 50 μm) was laminated on the pressure-sensitive adhesive layer, thereby manufacturing a pressure-sensitive adhesive tape having the structure of FIG. 1.

Examples 2 and 3 and Comparative Examples 1 to 3

Pressure-sensitive adhesive tapes were manufactured by the same method as described in Example 1, except components blended in the preparation of the pressure-sensitive adhesive composition and ratios thereof were controlled as shown in Table 1.

TABLE 1

|  |  | Example | | | Comparative Example | | |
| --- | --- | --- | --- | --- | --- | --- | --- |
|  |  | 1 | 2 | 3 | 1 | 2 | 3 |
| Blending ratio of polymer solution | (A) | 100 | 100 | 100 | 100 | 100 | — |
|  | (B) | 0.5 | 5 | 30 | — | 40 | — |
|  | (C) | — | — | — | — | — | 100 |
| Blending ratio of crosslinking agent |  | 0.3 | 0.3 | 0.3 | 0.3 | 0.3 | 0.3 |

Unit of blending ratio: weight ratio (in case of polymer solution, based on solid content)
Crosslinking agent: isocyanate-based crosslinking agent (TDI)

Physical properties measured with respect to the pressure-sensitive adhesive tape of Example or Comparative Example were summarized in Table 2.

TABLE 2

|  | Example | | | Comparative Example | | |
| --- | --- | --- | --- | --- | --- | --- |
|  | 1 | 2 | 3 | 1 | 2 | 3 |
| Generation of bubbles | ◯ | ◯ | ◯ | ◯ | X | ◯ |
| Lift-off/peeling | ◯ | ◯ | ◯ | ◯ | X | ◯ |
| Peeling strength (gf/25 mm) | 2390 | 2440 | 2310 | 2430 | 2150 | 1820 |
| Resistance change rate (%) | 7 | 4 | 2 | 14 | 2 | 5 |

The invention claimed is:

1. A conductive laminate, comprising:
   a substrate layer;
   a pressure-sensitive adhesive layer formed on one or both surfaces of the substrate layer; and
   a conductive layer present between the substrate layer and the pressure-sensitive adhesive layer,
   wherein the pressure-sensitive adhesive layer is formed from a pressure-sensitive adhesive composition comprising 100 parts by weight of a pressure-sensitive adhesive polymer, and 0.1 to 35 parts by weight of a polymerized product of a monomer mixture comprising a thiol compound,
   wherein the thiol compound and the monomer mixture constitute the polymerized product,
   wherein the polymerized product has a weight average molecular weight of 1,000 to 200,000,
   wherein the conductive layer has a resistance change rate of 10% or less, and
   wherein the thiol compound is a compound of Formula 1:

    [Formula 1]

where R is an unsubstituted alkyl group or an alkyl group substituted with at least one substituent selected from the group consisting of a thiol group, a hydroxyl group and an oxyranyl group, or a substituent of Formula 2,

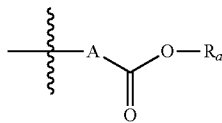    [Formula 2]

where A is an alkylene group, $R_a$ is hydrogen, an alkyl group, or $-L_1-C(-L_2-O-C(=O)-L_3-SH)_n R_{(3-n)}$, in which $L_1$ to $L_3$ are each independently an alkylene group, R is hydrogen or an alkyl group, and n is a number from 1 to 3.

2. The conductive laminate of claim 1, further comprising a metal mesh layer present between the substrate layer and the pressure-sensitive adhesive layer.

3. The conductive laminate of claim 2, wherein the metal mesh layer comprises silver, copper or an alloy thereof.

4. The conductive laminate of claim 1, further comprising a transparent substrate attached to the pressure-sensitive adhesive layer.

5. The conductive laminate of claim 1, wherein the pressure-sensitive adhesive layer has a peeling strength of 1,900 gf/25 mm or more at a room temperature, relative to a polycarbonate film when the pressure-sensitive adhesive layer is formed on the polycarbonate film.

6. The conductive laminate of claim 1, wherein the pressure-sensitive adhesive polymer comprises 80 to 99.99 parts by weight of a (meth)acrylic acid ester monomer and 0.01 to 20 parts by weight of a copolymerizable monomer having a crosslinkable functional group.

7. The conductive laminate of claim 6, wherein the crosslinkable functional group is a hydroxyl group, a carboxyl group, an isocyanate group, a glycidyl group or a derivative thereof.

8. The conductive laminate of claim 1, wherein the pressure-sensitive adhesive polymer has a weight average molecular weight of 300,000 to 2,000,000.

9. The conductive laminate of claim 1, wherein the thiol compound is a compound in which R of Formula 1 is an unsubstituted alkyl group having 1 to 20 carbon atoms, an alkyl group having 1 to 20 carbon atoms substituted with a hydroxyl group, or an alkyl group having 1 to 20 carbon atoms substituted with an oxyranyl group.

10. The conductive laminate of claim 1, wherein the monomer mixture comprises 0.01 to 10 parts by weight of a thiol compound, relative to 100 parts by weight of the monomer.

11. The conductive laminate of claim 1, wherein the monomer mixture comprises a (meth)acrylic acid ester monomer.

12. The conductive laminate of claim 1, wherein the monomer mixture comprises a copolymerizable monomer having a crosslinkable functional group.

13. The conductive laminate of claim 1, wherein the pressure sensitive adhesive composition further comprises a multifunctional crosslinking agent at 0.01 to 10 parts by weight, relative to 100 parts by weight of the pressure-sensitive adhesive polymer.

14. A touch panel, comprising the conductive laminate of claim 1.

* * * * *